United States Patent Office 3,542,835
Patented Nov. 24, 1970

3,542,835
(3-CHLORO-2-METHYLPROPYL) DIMETHYLSILANOL
Richard W. Alsgaard, Midland, Mich., assignor to Dow Corning Corporation, Midland, Mich., a corporation of Michigan
No Drawing. Filed Aug. 15, 1968, Ser. No. 752,774
Int. Cl. C07f 7/08
U.S. Cl. 260—448.2                      1 Claim

ABSTRACT OF THE DISCLOSURE (3-chloro-2-methylpropyl)dimethylsilanol which is useful as an evaporation retardant is disclosed.

---

This invention relates to (3-chloro-2-methylpropyl)dimethylsilanol.

The precursor of (3-chloro-2-methylpropyl)dimethylsilanol is (3-chloro-2-methylpropyl)dimethylchlorosilane which is known. John W. Ryan, Gerald K. Menzie and John L. Speier describe the preparation of (3 - chloro-2 - methylpropyl)dimethylchlorosilane in "The Addition of Silicon Hydrides to Olefinc Double Bonds. Part V. The Addition to Allyl and Methallyl Chlorides," Journal of the American Chemical Society, vol. 82, July 20, 1960, pages 3601 to 3604. Ryan et al. also describe the hydrolysis of (3-chloro-2-methylpropyl)dimethylchlorosilane with ice and water and obtained 1,3 - bis - (3-chloro-2-methylpropyl)tetramethyldisiloxane.

It is an object of the present invention to provide (3-chloro-2-methylpropyl)dimethylsilanol which inhibits the evaporation of water.

The best method of preparing (3-chloro-2-methylpropyl)dimethylsilanol is to mix (3-chloro-2-methylpropyl)dimethylchlorosilane with sodium bicarbonate in the absence of water. The mixture is filtered to remove the sodium chloride which is formed and to recover the (3-chloro-2-methylpropyl)dimethylsilanol. Carbon dioxide leaves the mixture as a gas.

The (3-chloro-2-methylpropyl)dimethylsilanol of the present invention is particularly useful as an evaporation retardant. The (3-chloro-2-methylpropyl)dimethylsilanol is applied to the surface of an aqueous body which is exposed to a gaseous atmosphere. The amount of (3-chloro-2-methylpropyl)-dimethylsilanol applied is determined by several factors, such as, temperature of the aqueous body, temperature of the atmosphere above the aqueous body and the movement of the atmosphere or the aqueous body. The amount of (3-chloro-2-methylpropyl)dimethylsilanol is usually applied to provide at least a monomolecular layer on the aqueous surface. However, more or less can be used depending upon the desired results. If one desires to control the rate of evaporation, one can apply less of the (3-chloro-2-methylpropyl)dimethylsilanol to provide some specific rate of evaporation which can be used as a means of controlling the temperature of an aqueous body.

The aqueous body can be a swamp, a field covered with water, a pond, a lake, a reservoir, or in a tank, in a ditch, in a dish, in a closed container with a controlled atmosphere and the like.

The (3-chloro-2-methylpropyl)dimethylsilanol can be applied to the aqueous body as is or in the form of an organic solution or by any other means suitable to disperse the compound over the aqueous surface.

The (3-chloro-2-methylpropyl)dimethylsilanol of the present invention retards the evaporation of water from surfaces of aqueous bodies.

The following example is illustrative only and should not be construed as limiting the invention which is properly delineated in the appended claim.

EXAMPLE 1

Sodium bicarbonate was mixed with a small amount of (3-chloro-2 - methylpropyl)dimethylchlorosilane. Sodium bicarbonate was added to the mixture until no further sodium chloride formed. The mixture foamed during the escape of the carbon dioxide. The mixture was filtered to remove the sodium chloride and any unreacted sodium bicarbonate and the remaining clear liquid was (3-chloro-2-methylpropyl)dimethylsilanol.

The (3 - chloro - 2 - methylpropyl)dimethylsilanol was made into a 10 weight percent diethyl ether solution. Ten drops of the ether solution were placed on the surface of 100 g. of tap water in a 250 ml. stainless steel cup. The resulting assembly was placed in a controlled atmosphere of 65% relative humidity and 68° F. The weight of the cup, water and ether solution was initially made and then observed at time intervals of 1 day, 2 days, 5 days and 7 days. A control cup was also placed in the controlled atmosphere. The control was prepared as described above but without the (3-chloro-2-methylpropyl)-dimethylsilanol solution.

The results below are the weight percentages of water lost in a given period under the test conditions.

| Compound | | Percent water loss after— | | | | Percent savings over Control |
|---|---|---|---|---|---|---|
| | | 1 day | 2 days | 5 days | 7 days | |
| 1 | Control | 7.3 | 14.7 | 35.0 | 47.2 | |
| 2 | $\text{ClCH}_2\overset{\underset{\displaystyle CH_3}{\displaystyle |}}{\text{CH}}\text{CH}_2\overset{\underset{\displaystyle CH_3}{\displaystyle |}}{\underset{\displaystyle |}{\text{Si}}}\text{OH}$ $\quad CH_3$ | 4.0 | 8.0 | 19.0 | 26.5 | 43.9 |

That which is claimed is:
1. (3-choloro-2-methylpropyl)dimethylsilanol.

References Cited

Bazant et al.: "Organosilicon Compounds," vol. 2, part 1, Academic Press, N.Y. (1965), p. 183.

TOBIAS E. LEVOW, Primary Examiner

P. F. SHAVER, Assistant Examiner